United States Patent
Käser (10) Patent No.: US 6,220,431 B1
(45) Date of Patent: Apr. 24, 2001

(54) HOUSING FOR DISC-SHAPED OBJECT AND METHOD AND DEVICE FOR THE PRODUCTION THEREOF

(76) Inventor: Walter Käser, Reggenschwilerstr. 33, Ch-9402, Mörschwil (CH)

( * ) Notice: Subject to any disclaimer, the term of this patent is extended or adjusted under 35 U.S.C. 154(b) by 0 days.

(21) Appl. No.: 09/308,909
(22) PCT Filed: Sep. 29, 1998
(86) PCT No.: PCT/CH98/00414
§ 371 Date: Jul. 26, 1999
§ 102(e) Date: Jul. 26, 1999
(87) PCT Pub. No.: WO99/17292
PCT Pub. Date: Apr. 8, 1999

(30) Foreign Application Priority Data

Sep. 30, 1997 (CH) .................................................. 2286/97
Jan. 30, 1998 (CH) .................................................. 227/98

(51) Int. Cl.⁷ .................................................. B65D 85/57
(52) U.S. Cl. .................................................. 206/308.1
(58) Field of Search .................................. 206/303, 307, 206/308.1, 308.3, 312; 229/68.1

(56) References Cited

U.S. PATENT DOCUMENTS

| | | |
|---|---|---|
| 3,949,873 | 4/1976 | Platt . |
| 4,709,812 | 12/1987 | Kosterka . |
| 5,188,229 * | 2/1993 | Bernstein .............................. 206/312 |
| 5,402,882 | 4/1995 | Bandy et al. . |
| 5,421,452 * | 6/1995 | Hybiske ............................... 206/312 |
| 5,460,265 | 10/1995 | Kiolbasa . |
| 5,462,158 * | 10/1995 | Kramer .............................. 206/308.1 |
| 5,518,488 | 5/1996 | Schluger . |
| 5,522,500 * | 6/1996 | Mori ................................. 206/308.1 |
| 5,697,496 * | 12/1997 | Bauer ............................... 206/308.1 |
| 5,772,022 * | 6/1998 | Renna ................................ 206/312 |

OTHER PUBLICATIONS

XP–002088970, Derwent Publication Ltd., May 16, 1989.

* cited by examiner

Primary Examiner—Jim Foster
(74) Attorney, Agent, or Firm—Browdy and Neimark

(57) ABSTRACT

A casing for a compact disk. The casing includes a housing and a cover made of fiber material, such as cellulose fibers. The housing includes a base that is at least as large as the diameter of the compact disk and a stand that is smaller than the diameter of the compact disk. The stand has a support surface for the disk and stops to engage the circumference of the disk. The cover includes a top wall, a front end wall and two side walls. A hinge engages the base to the cover. A tongue projects from the free end of the front end wall of the cover. A catch projects from the stand. Upon closing of the casing, the tongue engages the catch.

19 Claims, 8 Drawing Sheets

HOUSING FOR DISC-SHAPED OBJECT AND METHOD AND DEVICE FOR THE PRODUCTION THEREOF

BACKGROUND OF THE INVENTION

1. Technical Field of the Invention

The present invention relates to a casing for a disk-shaped item, especially for a compact disk, having a base part, which is adapted to receive and hold said item, and having a cover, which is pivoted on the base part. This invention further relates to a method and a device for manufacturing said casing.

2. Prior Art

Casings of this type are already known and they are normally made of a plastic material. The casing cover has two lateral tabs, free ends of which are pivoted at the base part of the casing. If such a casing falls e.g. on the floor, then one of the tabs breaks off very easily and such a casing is then no longer usable. In the course of the recycling of such plastic casings further problems arise.

OBJECT OF THE INVENTION

The object of the present invention is to eliminate said disadvantages as well as further disadvantages of the prior art.

BRIEF DESCRIPTION OF THE DRAWINGS

Embodiments of the present invention are explained in more detail in the following with reference accompanying drawings. It shows.

DETAILED DESCRIPTION OF THE PREFERRED EMBODIMENT(S) OF THE INVENTION

Figure 1:
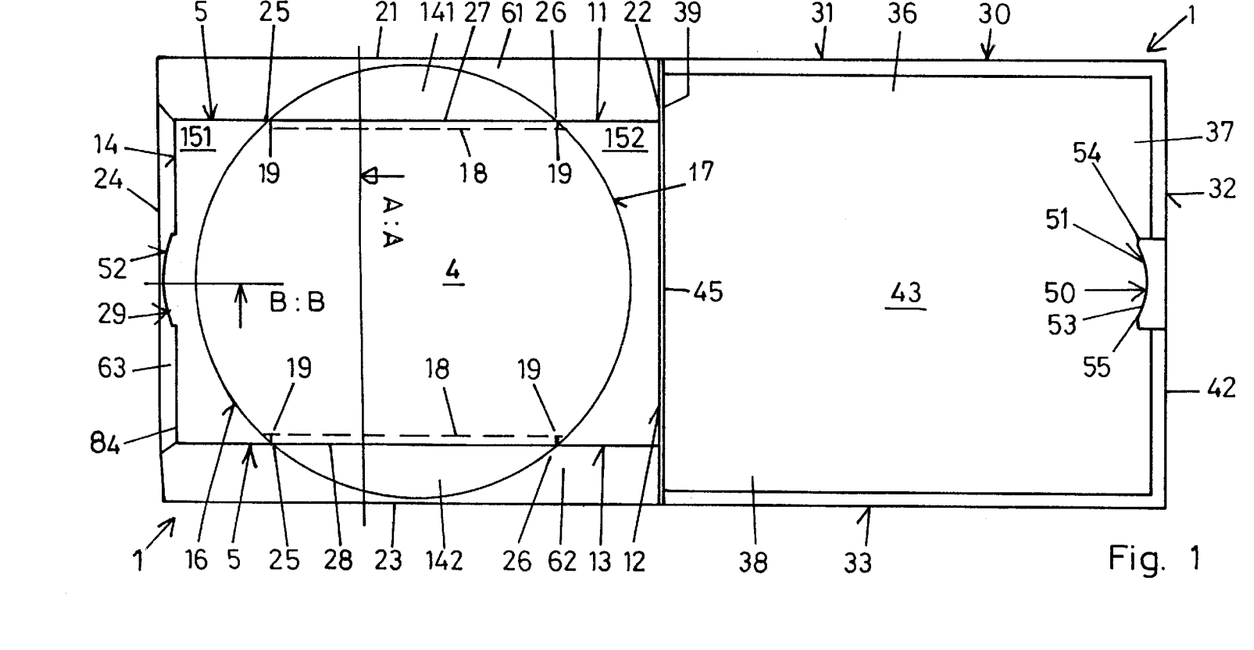
FIG. 1 in a plan view a first embodiment of the present casing, which is open.
Figure 2:
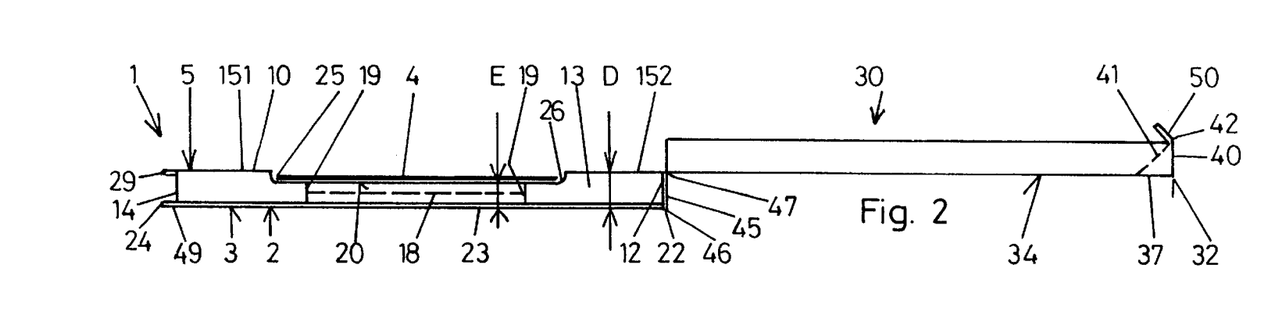
FIG. 2 in a side view the casing from FIG. 1.
Figure 3:
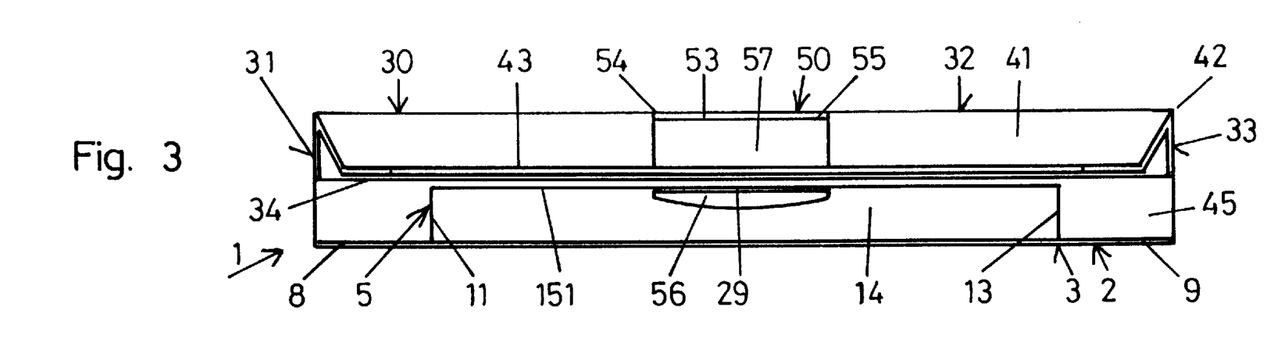
FIG. 3 in a front view the casing from FIG. 1.

FIG. 1, 2 and 3 show the present casing in the open, swinged out condition, in which a disk-shaped item 4, especially a compact disk, can be put into the casing. This casing has a lower or base part 1, which is adapted to receive and hold the item 4, and a cover 30, which is pivotally attached to the base part 1. Said base part 1 and the cover 30 are made of fibers, especially cellulose-fibers. The lower part 1 has a bottom 2 and a section 5, which is placed on the bottom 2 and which is adapted for the mounting of the diskshaped item 4 thereon. This section 5 is denoted in the following also as a base 5. This base 5 is hollow.

The bottom 2 has an at least essentially flat main body 3, the outline of which is rectangular. The outline of this main body 3 can have a square or an oblong shape.

Figures 4, 5:
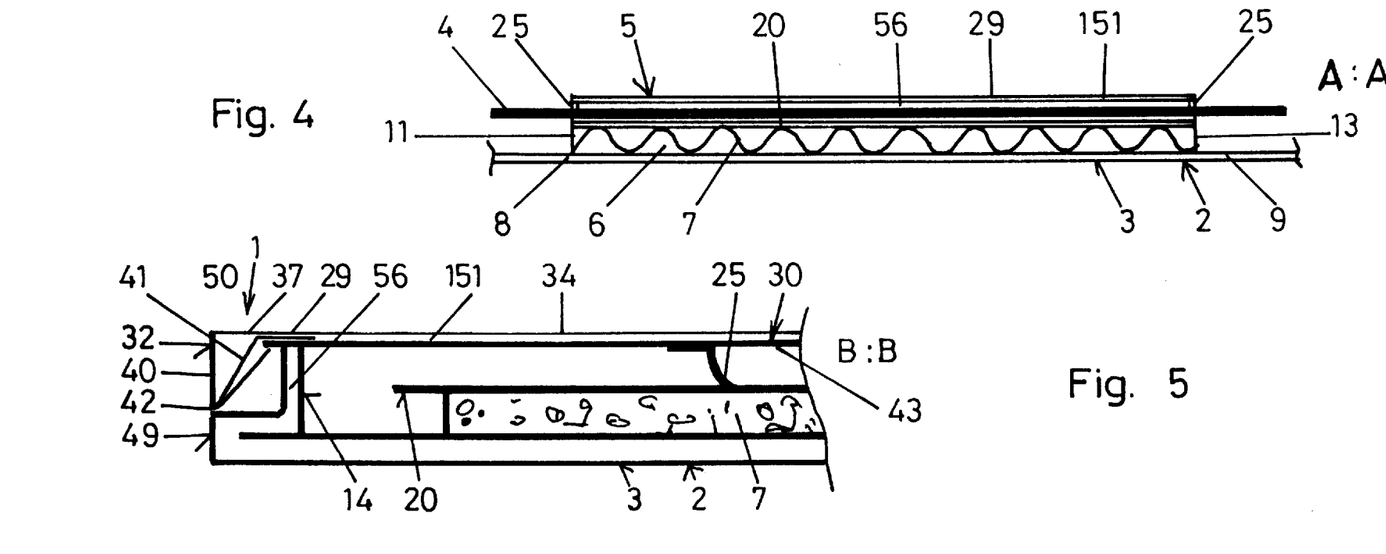
FIG. 4 in vertical cut a detail from FIG. 3.
FIG. 5 a vertical cut the front edge area of the casing from FIG. 2, when the casing is closed, whereby this cut extends in the same direction as the view of the front view according FIG. 3.

In the depicted case, the main body 3 of the bottom 2 has an oblong shape and it has sides 21, 22, 23 and 24. The length of the shorter sides 22 and 24 of said bottom main body 3 is at least as large as the diameter of the disk-shaped item 4, so that the bottom 2 has sections 8 and 9 (FIG. 4), which stand apart from one to another. These sections 8 and 9 exceed the contour of the item 4. When the bottom main body 3 is square shaped then the length of all sides of the bottom main body 3 are at least as long as the diameter of the disk-shaped item.

The base 5, which sticks out from the bottom plate 3 or which projects from this plate 3 upwards, comprises side walls 11, 12, 13 and 14 as well as an upper termination 10. The outline of this base 5 has an oblong shape. The length of the shorter sides 12 and 14 of the base 5 is smaller than the diameter of the item 4, so that the each other opposite placed edge portions 141 and 142 of the item 4, when it rests on the base 5, overhang this base 5 and consequently these edge portions 141 and 142 are free for grasping the item 4. Because that one measurement of the bottom 2, which extends parallel to the cross sides 12 and 14, is larger than the diameter of the item 4, the respective edge area of the bottom 2 has the section 8 or 9, shown in FIG. 4. These edge sections 8 and 9 stick out horizontally from the opposite side walls 11 and 13 of the base 5 and they protect against damage those edge-sections 141 and 142 of the disk-shaped item 4, which are projecting from the sides of the base 5.

The longer side walls 11 and 13 of the oblong shaped base 5 are longer than the diameter of the item 4 but they are shorter than the length sides 21 and 23 of the bottom 2 of the casing which extend in the same direction. The upper part 10 of the base, which extends between the longer side walls 11 and 13 of the base 5, has the form of a plate in a blank, from which the casing is manufactured. This plate 10 has a middle section 20, on which the item 4 can rest. Further, said plate 10 has plate sections 151and 152, whereby the respective one of these sections 151 and 152 is placed laterally with respect to said middle or resting plate 20. Consequently, the upper plate 10 of the base 5 comprises said two subplates 151 and 152, which are situated in a distance to each other, whereby said bearing plate 20 lies between said subplates. The subplates 151 and 152 and the bearing plate 20 form a row and the direction of this row runs parallel to the longitudinal walls 11 and 13 of the base 5. The form or the outer contour and the measurements of the bearing plate 20 correspond at least by sections to the form and the measurements of the item 4.

The subplates 151 and 152 lie at opposite sides of the bearing plate 20 and they extend between the end section of the side walls 11 and 13, which overhang the bearing plate 20. Between the bearing plate 20 and the subplates 151 and 152 continuous cuts 16 and 17 exist, which separate the bearing plate 20 from the respective subplate 151, 152.

The shape and the measurements of these cuts 16 and 17 correspond to the form and to the measurements of the assigned sections of the outer contour of the item 4. In the case, which is depicted in FIG. 1, both the cuts 16 and 17 have the form of a circle segment because of the disk shaped item 4. The distance between the opposite point of the circle segment shaped cuts 16 and 17 corresponds at least essentially to the diameter of the item 4.

The subplates 151 and 152 run practically parallel to the bottom plate 3 and they lie in a distance D from this bottom plate 3. The bearing plate 20, which lies between the subplates 151 and 152 and which also extends between the long sides 11 and 13 of the base 5 runs also practically parallel to the bottom 2 of the lower part 1 and it is in a distance E from the bottom 2. This distance E is smaller than the distance D, which exists between the subplate 151, 152, respectively and the bottom 2. The difference between these two distances D and E is chosen in such a manner, that said difference is larger than the thickness of the disk shaped item 4. When the item 4 rests on the bearing plate 20, the upper side thereof lies under the subplates 151 and 152. In the foregoing it has already been stated, that the distance between the longer sides 11 and 13 of the base 5 is smaller than the diameter of the item 4. Consequently, the contour of the bearing plate 20 has the form of a circle flattened in the areas of said longitudinal walls 11 and 13.

The contour of the bearing plate 20 comprises two arched sections 17 and 18, which are situated apart from to each other. Said contour also comprises two straight running edges 27 and 28, from which each one connects together those ends of the bow 17 and 18, which are placed opposite to each other or which are associated to each other. These arched edges 17 and 18 are situated in the upper area of the respective longitudinal wall 11 or 13 of the base 5 and they are placed in the middle area of the respective longer side wall 11 or 13 of the base 5.

Figure 6:
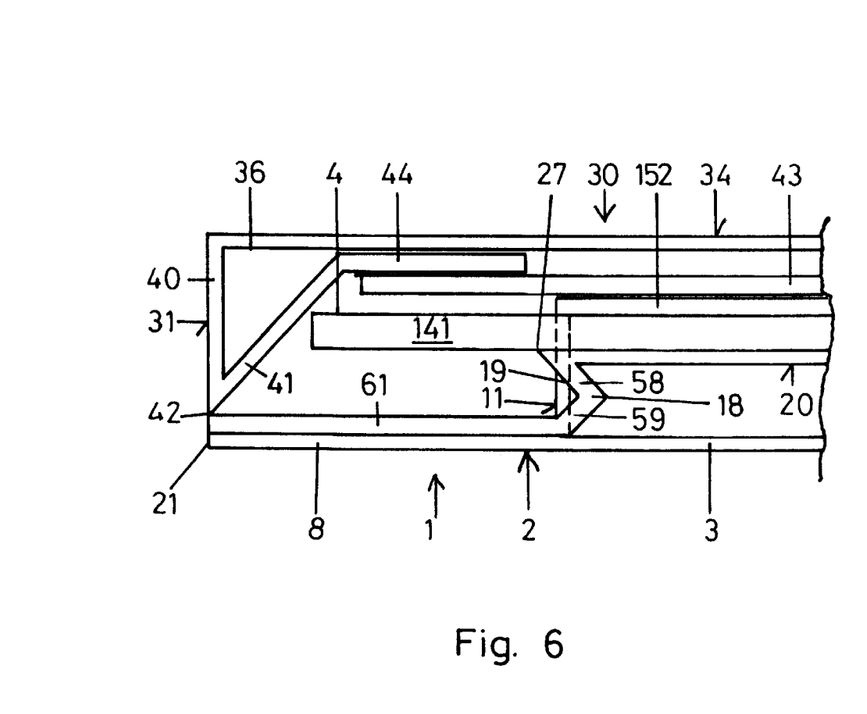
FIG. 6 in a verbal cut one of the lateral edge areas of the casing, when this is closed, whereby this cut runs parallel to the cut according to FIG. 4.

In the respective longer side wall 11 or 13 of the base 5 a rectilinear perforation 18 (FIG. 1 and 6) is carried out. This perforation 18 extends practically parallel to the respective longitudinal edge 27 or 28 of the longitudinal wall 11 or 13 or to the bottom 2 of the bearing plate 20. The perforation line 18 is placed approximately in the middle region of the height of the longitudinal wall 11 or 13 and it divides the respective wall 11 or 13 into two parts or halves, namely into an upper half 58 and a lower half 59 (FIG. 6). The longitudinal edge of the upper wall-half 58, which is averted from the perforation 18, is connected to the longitudinal edge 27 or 28 of the bearing plate 20. An edge fin 61 or 62 of the base 5 is connected to that one longitudinal edge of the lower wall-half 59 which is averted from the perforation 18. Said edge fin 61 or 62 is foreseen for resting on one of the lateral edge portions 8 or 9 of the bottom plate 3. During the manufacturing of the casing, said edge fins 61 and 62 are connected solidly with the edge portions 8 and 9 of the bottom plate 3.

The perforation line 18 is shorter than the longitudinal edges 27 and 28 of the bearing plate 20. Perpendicularly to the perforation line 18 separation cuts 19 are carried out in the respective side wall 11 and 13 of the base 5, from which each one is placed at one end of the perforation line 18 and it extends practically over the whole height of the longitudinal wall 11 or 13. Consequenty, the separation cuts 19 separate the middle areas 27 and 28 of the longitudinal walls 11 and 13 from the margin areas of these walls 11 and 13.

The distance between the two ends of the separation cuts 19, each assigned to one of the perforation lines 18, is smaller than the distance between the longitudinal stops 25 and 26 of the item 4, which lie on the same longitudinal edge 27 or 28 of the bearing plate 20 in the longitudinal wall 11 or 13 and which are described in more detail in the following. That one end portion of the upper half 58 of the wall, which extends between the respective stop 25 or 26 and the next lying separation cut 19, is removed in the course of the manufacturing from the blank, so that windows 65 (FIG. 7) in the longitudinal walls 11 and 13 of the base 5 result therefrom.

If pressure is exerted on the bearing plate 20 of the raised base 5 during the manufacturing of the casing, then the middle section of the longitudinal walls 11 and 13, which lies between the cuts 19, folds in the area of the perforation line 18 towards the interior and the bearing plate 20 and it becomes lowered with respect to the subplates 151 and 152 of the base 5 against the bottom 2 of the base part 1.

In the course of the lowering of the bearing plate 20, the already mentioned edges 25 and 26 in the respective longitudinal walls 11 and 12 of the base 5 come forth, whereby these edges bridge the height-difference D–E between the respective subplate 151, 152 and the lowered bearing plate 20.

Such edges 25 and 26 represent stops in the area of the respective side wall 11 and 13 for the item 4, which lies on the bearing plate 20, whereby said stops lie opposite to each other. Consequently, said stops 25 and 26 lie higher than the surface of the bearing plate 20. The distance between the stops 25 and 26 in the respective longitudinal wall 11 and 13 is the same as the length of the chord at the item 4, which lies over the edges 27 and 28 of the bearing plate 20. Consequently, said longitudinal stops 25 and 26 hold the item 4 at place in the direction of the longitudinal walls 11 and 13.

In a cavity 6 (FIG. 4), which exists between the bearing plate 20 and the bottom 2 of the lower part 1, there lies an insert 7, the thickness of which corresponds to the height of the cavity 6 and which is preferably made of a cellular board.

As already explained, the longitudinal walls 11 and 13 of the base 5 are shorter than the longitudinal edge 21 and 23 of the bottom plate 3. The base 5 is positioned on the bottom 2 in such a way, that one of the cross walls 12 of the base 5 lies over one of the cross edges 22 of the bottom 2. In the area of the opposite cross edge 24 of the bottom 2, a margin strip 49 (FIG. 2) of the bottom 2 exists, which overhangs the base 5. This margin strip 49 is situated between said cross edge 24 of the bottom 2 and that partition 24 of the base 5, which is here placed.

An extension 29 projects practically at a right angle (FIG. 1 to 5) from one of the cross walls of the base 5. In the depicted case, this is that one cross—or front wall 14 of the base 5, which is situated over the margin strip 49 of the bottom plate 3. A strip-like mounting fin 63 is connected to that one edge of the partition 14, which faces the margin strip 49. During the manufacturing of the casing, said mounting fin 63 comes to rest on the margin strip 49 and it is attached to this strip 49.The length of the extension 29, which projects from the base partition 14, is smaller than the width of the said mounting fin 63 and consequently also of the margin strip 49. The extension 29 forms a continuation of the subplate 151, which lies in this area of the base 5 and this extension 29 lies consequently in the same plane as this subplate 151. The transition between the extension 29 and the subplate 151 is smooth. This means, that this extension 29 is adjoined rigid, i.e. not flexible to the subplate 151.

The cover 30 of the casing comprises side walls 31, 32 and 33 as well as a top wall 34. The side walls 31, 32 and 33 project practically at a right angle from three of the edges 36, 37 and 38 of the top wall 34, in fact so, that they are directed towards the base part 1, when the casing is closed. In FIG. 1 to 10, the casing is shown in the opened condition. The cover 30 is adjoined, or pivoted, over his fourth edge 39 to the lower part 1. The outer contour of the cover 30, consisting from the side walls 31, 32 and 33 and from said connecting margin 39 lies over or within the outer contour of the lower part 1.

Consequently, the form of the lower part 1 determines the form of the cover 30.

The side walls 31 or 32 or 33 of the cover 30 have a hollow section. The cross-section of such a profile has the form of a right angled triangle (FIG. 3 and 6). The first cathetus of this triangle is formed by that one margin portion 36, 37 or 38 of the top wall 34, from which the relevant side wall 31, 32 or 33 sticks out or is pending. The second cathetus of said triangle shaped cross section is formed by an outer or vertically extending section 40 of the side wall 31 or 32 or 33, which stands practically at a right angle to the top wall 34. The hypotenuse of the triangle shaped cross section is formed by an interior section 41 of the side wall 31 or 32 or 33, which extends inclined with respect to the top wall 34 and which extends between the top wall 34 and the free edge 42 of the side wall 31 or 32 or 33. Such hollow or spatially executed side walls 31 to 33 enhance effectively the stiffness of the cover 30, which is manufactured from a relatively thin material.

A fin 44 adjoins to the interior or free edge of the inclined running inside section 41 of the lateral cover walls 31 and 33. This fin 44 rests on the inside of the top wall 34. The cover 30 comprises also an interior wall 43, which is connected via one of its cross edges to the partition 32 of the cover 30, in fact to the free edge of the inclined wall 41 of this partition 32.

Said interior wall 43 covers not only the middle area of the interior side of the top wall 34 but also the interior side of the mounting fins 44 on the side walls 31 and 33. The interior wall 43 is rigidly connected to the top wall 34 and to the mounting fins 44, for example by aid of a glue. In this manner the interior wall 43 additionally strengthens the cover 30 manufactured from a relatively thin material.

As it is apparent from FIG. 6, the item 4 lies within the height of the side walls 31 and 33 of the cover 30, when the casing is closed and when the front edges 42 of the cover walls 31 to 33 rest on the margin flaps 61 and 62 of the base 5. The measurements of the casing and the inclination of the inclined running inner wall sections 41 of the side- or longitudinal walls 31 and 33 of the cover 30, which are each situated opposite to another, are chosen in such a manner, that said inclined wall sections 41 come to rest from above on the outer edge of the item 4, in fact in the area of the already mentioned marginal sections 141 and 142 of the item 4.

Consequently, a space for receiving the item 4 is defined by the receiving plate 20 on the lower side and in the longitudinal direction of the base 5 by the stops 25 and 26 in the longitudinal walls 11 and 13 of the base 5. In the cross-direction of the base 5, the edge portions 141 and 142 of the item 4 come to rest on the inclined running inside sections 41 of the side walls 31 and 33 of the cover 30. In the upper region, the receiving space in the base 5 is open, so that the item 4 can be put into this space or that the item 4 can be taken off from this space, when the casing is open.

Means are foreseen serving for adjoining the cover 30 to the base part 1. These means are placed in that one margin area 39 of the cover 30, which has no side wall. Said means comprise a material strip 45, which is situated between the top wall 34 of the cover 30 and the base plate 3 of the bottom 2 or of the lower part 1. This material strip 45 extends along the connecting margin 39 of the cover 30 and along the cross edge 22 of the lower part 1. The width of this material strip 45 is the same as or corresponds to the height of the partition 12 of the base 5, whereby said partition 12 is situated over said cross edge 22 of the lower part of 1.

The connecting means furthermore comprise bending lines 46 and 47, which extend along the longitudinal edge of the material strip 45. Over the first of these bending lines 46, the material strip 45 is adjoined to the here lying cross edge 22 of the base plate 3 of the lower part 1. Over the second of the bending lines 47, the material strip 45 is adjoined to the connecting margin 39 of the top wall 34 of the cover 30. Consequently, the longitudinal edges of the material strip 45 are under interlying of the bending lines 46 and 47 integral with the top wall 34 of the cover 30 and with the base plate 3 of the base part 1.

In the embodiment of the casing depicted in FIG. 1 to 3, the inside of the material strip 45 is moreover rigidly connected to the outside of the partition 12 of the base 5, for example by means of a glue. Consequently, the material strip 45 and thereby also the cover 30 are connected to the base part 1 not only over the first bending line 46 but also over the partition 12 of the base 5. The material strip or the connecting wall 45 stands at a right angle to the base plate 3 of the base part 1. In the course of the opening or closing of the casing, the cover 30 swings in this embodiment only about the second bending line 47. In the embodiments of the casing depicted in FIG. 9 and 10, the material strip 45 is connected to the lower part 1 only and the first bending line 46. This means, that it connecting wall 45 is freely swingable with respect to the partition 12 of the base 5. Consequently, the cover 30 swings in this case with respect to the base part 1 at both the bending lines 46 and 47, when the casing is opened or closed.

At least one tongue 50 sticks out from the cross wall 32 of the cover 30, which is situated opposite to said connecting margin 39 of the cover 30. This tongue 50 is adjoined to the remaining part of the cover 30 in the area of the free edge 42 of the mentioned cover cross wall 32, which is situated apart from the top wall 34, so that this tongue 50 is placed in a distance from the top wall 34. The tongue 50 is essentially directed towards the interior of the cover 30 and it is swingably connected to the cross wall 32. Thereby, the tongue 50 is carried out and placed in such a manner, that it can back-grip the extension 29 on the base part 1, when the casing is closed. It is of advantage, to arrange the extension 29 in the middle area of the partition 14 of the base 5 and to arrange the tongue 50 in the middle area of the cross wall 32 of the cover 30.

The length of the tongue 50, i.e. the distance between the face edge 51 of the tongue 50 and the free edge 42 on the side wall 32 of the cover 30 is somewhat larger than the width of the margin strip 49 of the base part 1.

During the last phase of the closing of the casing, the tongue 50 comes first to rest on the upper side of the extension 29. Then the tongue 50 is swinged upwardly because of the pressure of the rigid extension 29 until it has passed the face edge 52 of the extension 29. Thereafter the tongue 50 strives to swing downwardly in direction to its normal position on the cover 30. Since the length of the tongue 50 is larger than the width of the material strip 49 of the base part 1, the tongue 50 cannot swing through and its face edge 51 comes to rest on the here lying partition 14 of the base 5 as it is indicated schematically in FIG. 5. In this position, the tongue 50 on the cover 30 back-grips the extension 29 on the lower part 1 and the casing remains closed.

When the casing is to be opened, the cover 30 is pulled in the usual manner away from the base part 1. Since not only the tongue 50 but also the further components of the base 5 are made of a flat material, for example of card board, the tongue 50 and also the relevant components of the base 5 yield without being damaged. When opening the casing, first the face edge 51 of the tongue 50 comes into contact with the underside of the extension 29. This urges the tongue 50 to swing downwards and enables the tongue 50 to move past the extension 29, in fact together with the cover 30.

The form of the face edge 51 of the tongue 50 consists of a middle, arched and concave section 53 and of practically rectilinear sections 54 and 55. Each one of these rectilinear sections 54 and 55 adjoins to the respective end of the curved section 53. These end sections 54 and 55 are in the same distance from the free edge 42 of the cover-wall 32. The distance between the end sections 54 and 56 and the free edge 42 of the cover wall 32 is to be considered as the length of the tongue 50 mentioned in the foregoing. When the casing is closed, only the end sections 54 and 55 of the tongue 50 lie on the outer surface of the partition 14 of the base 5.

The front edge 52 of the extension 29 at the base part I is also arched, in fact convex, whereby the radius of this bow 52 can be the same as the radius of the bow 51 at the tongue 50.

A blank (FIG. 7), from which the casing can be manufactured, has the form of a material web, in which the material sections forming the individual components of the casing are placed consecutively one after another. A first material section is foreseen and adapted for forming the base 5. A second material section is foreseen and adapted for forming the base part 1. A third material section is foreseen for forming the cover 30 and a fourth material section serves for forming the cover interior wall 43.

Figures 7, 11:
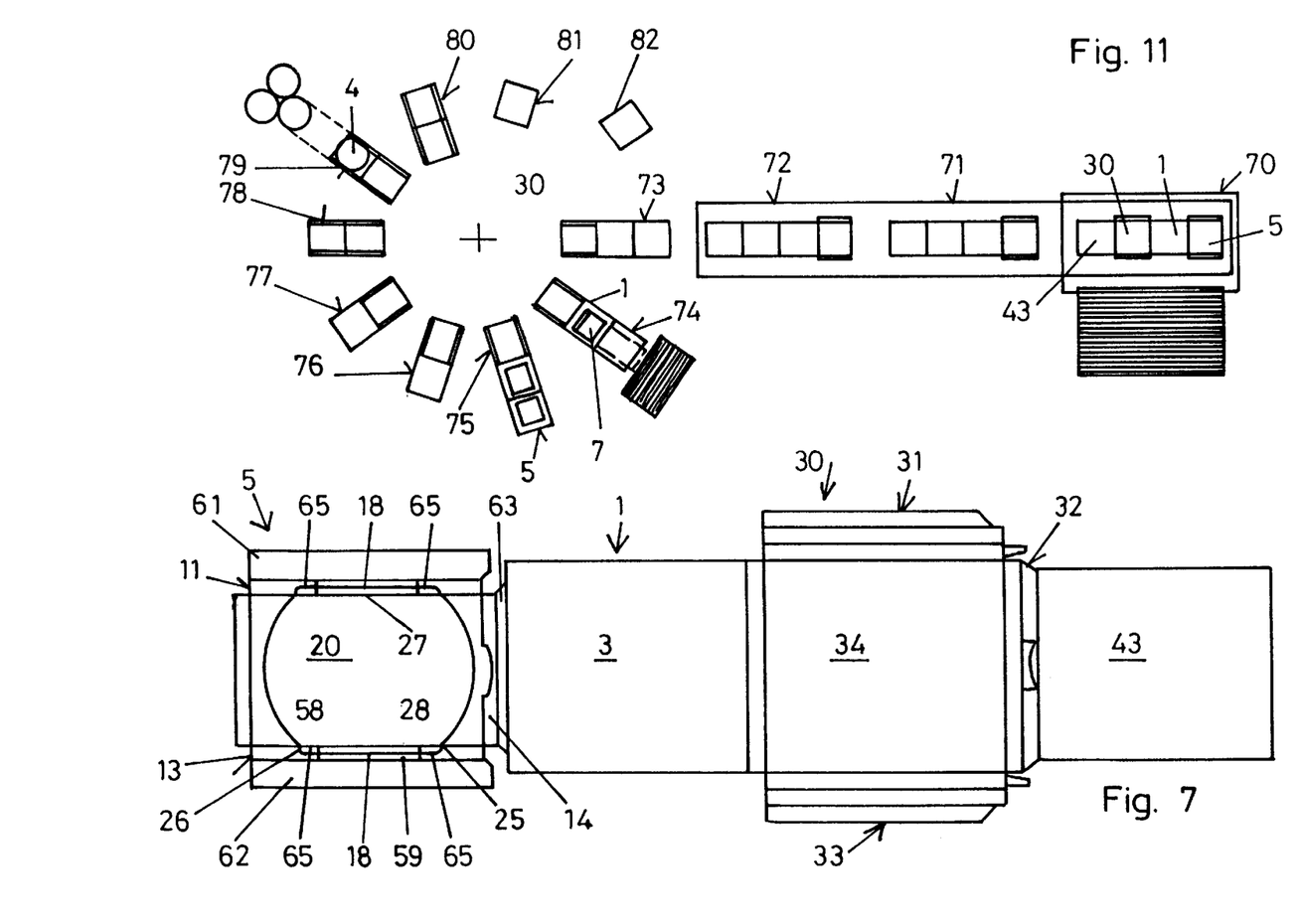
FIG. 7 in a plan view a blank, from which the casing can be manufactured.
FIG. 11 the floor plane of a device for the manufacturing of the casing.

In the course of the manufacturing of the casing, first of all the blank, shown in FIG. 7, is cut out and this blank is provided with the necessary bending lines, by stamping, for example. From said blank, first the cover 30 is formed by folding the side tangs of the blank, which represent the broadsides 31 and 33 of the cover 30, and by turning the side tangs towards the inside. After that, the interior wall of the cover 43 is put on the covering wall 34 in such a way, that the cross wall 32 of the cover 1 is formed which is lying therebetween. Then, the reinforcing insert 7 is put on the bottom plate 3 of the lower part 1. Thereafter, the first section of the blank is put on the lower part 1 and folded, so that the base 5 is formed. Finally, the item 4 can be inserted into the still opened casing, this casing can be closed, packed etc.

For the manufacturing of the extension 29 and of the tongue 50, corresponding cuts are carried out already in the course of the manufacturing of said blank, i.e. when it still lies flat. Said cuts are carried out in the second partition 14 of the base 5 and of the inclined section 41 of the cross wall 32 of the cover 30. As to the extension 29, the cut 52 begins at that one bending edge 84 of the base 5, which lies between the partition 14 and the first subplate 151, connected to said partition 14. This cut 52 runs first in a right angle to said bending edge, then arched in the partition 14, in fact approximately parallel to the bending edge, and thereafter in right angle back again to said bending edge 84, where it ends in a distance from ist beginning. As to the tongue 501 the cut 51 begins in the inclined wall section 41 at the free edge 42 of the cover wall 32. From here, the cut 51 runs first in a right angle to the free edge 42 and then the first end section 54 of this cut 51 runs parallel to the free edge 42. To this end section 54 the concave section 53 and then the second end section 55 are connected and from this it goes in a right angle back again to the free-edge 42.

When the blank is folded to form the casing, then the stiff extension 29 remains non folded and it results in a free corresponding opening 56 (FIG. 3 and 4) in the partition 14 of the base 5. Consequently, the extension 29 is at the same height as the subplate 151 of the base 5. The tongue 50, which sticks out from the free edge 42 of the cover 30, has left free an opening 57 (FIG. 3) in the inclined section 41 of the cover wall 32 in the course of the folding of the blank and it can be swung about the free-edge 42.

It is also possible to manufacture the casing using more than one blank. The casing can for example be manufactured by aid of two blanks. From one of these blanks the base 5 is made and this base 5 is placed and secured on the bottom disk 3 of the lower part 1.

Figure 8:
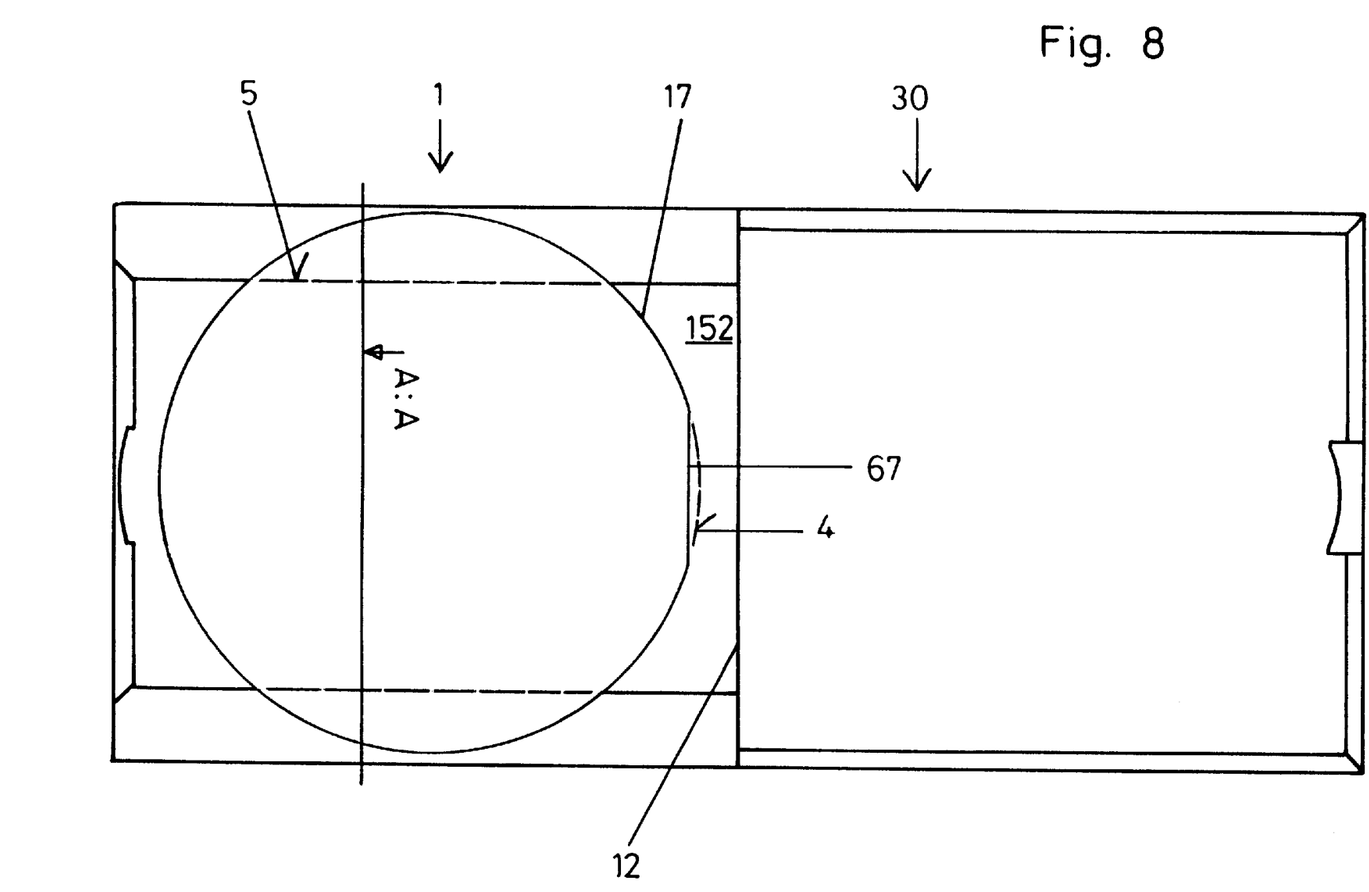
FIG. 8 in a view of another embodiment.
Figure 9:
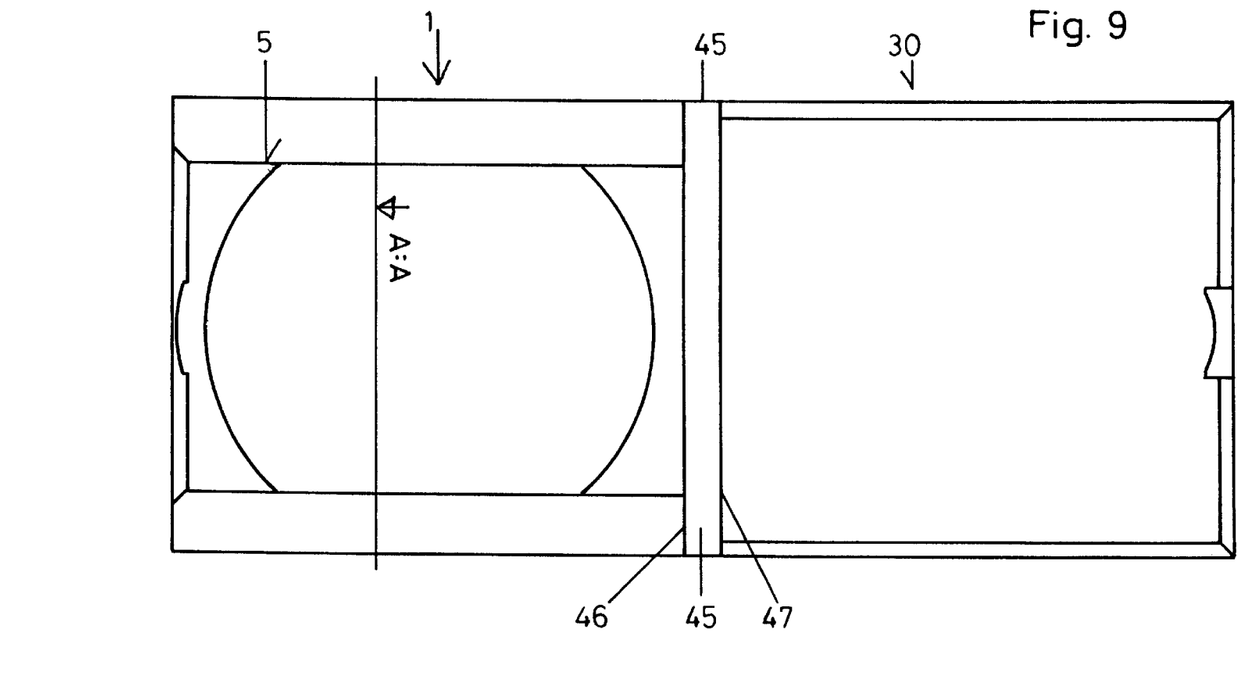
FIG. 9 in a plan view a third embodiment of the present casing.
Figure 10:
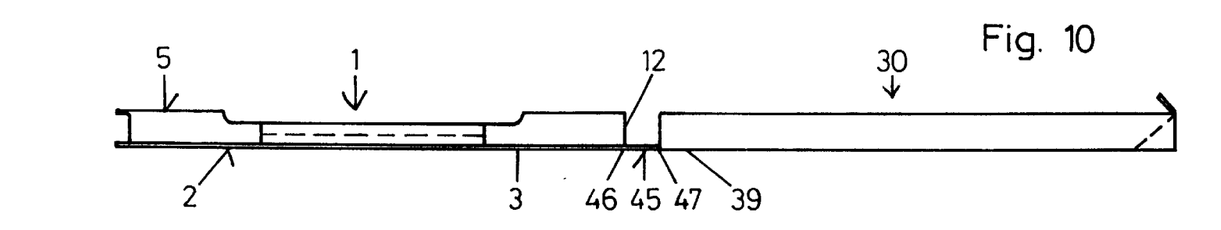
FIG. 10 in a side view the casing from FIG. 9.
Figure 12:
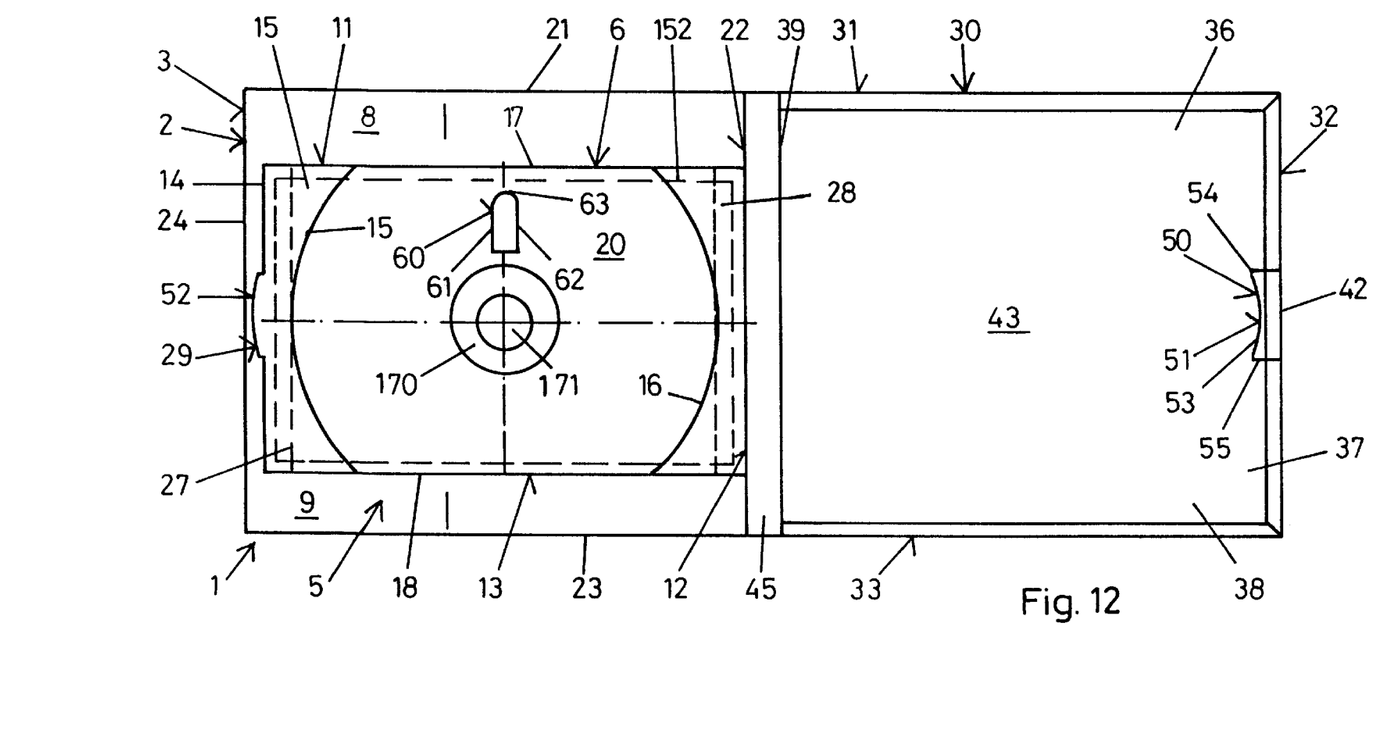
FIG. 12 in a plan view another embodiment of the present casing, when this is open, whereby a folder is foreseen, on which a disk-shaped item rests, FIG. 13 in a side view the casing from FIG. 12, FIG. 14 in a side view and enlarged the holder alone, FIG. 15 in a vertical cut the holder from FIG. 14, whereby this cut stands vertically to the direction of the side view in FIG. 14, and FIG. 16 a modification of the blank from FIG. 8.

In FIG. 8 another embodiment of the present casing is presented, which distinguishes from the embodiment depicted in FIG. 1 only in the form of the cut 17.

This cut 17 is also essentially arched at the casing according to FIG. 8. In its middle area, said cut 17 has a straight running edge 67, which runs like a chord to a bow and at the same time parallel to the partition 12 of the base 5. This section of the subplate 152 defined by said chord 67 represents another stop for the item 4 placed above a section of the margin portion of the item 4.

In FIG. 11 a device for carrying out the method described in the foregoing is presented. This device is carried out as a production line. At the beginning of this production line, an arrangement 70 for the supply of cuts is placed. On these supply arrangement 70 a first workstation 71 follows, in which the sections 40, 41 and 44 of the sidewalls and of the longitudinal walls 31 and 33 of the cover 30 are tilted up and in which the mounting fins 44 are glued. In a second and following workstation 72, the mounting fins 44 are pressed onto the covering wall 34 of the cover 30. In a third workstation 73 of the production line, the inside lining 43 is put on the inside of the cover wall 34, whereby the partition 32 of the cover 30, which also has the triangle shaped cross-section, is at the same time manufactured.

In a fourth workstation 74, the insert 7 is taken from a stack and it is placed on the base part 1 of the blank. In the next workstation 75, the base 5 is worked out, which is put onto the bottom 2 in a following station 76.

The inside of the base 5 and the inside of the interior wall of the cover 43 are glued in a further workstation 77 and in the next workstation 78 said components are pressed on the lower part 1 or onto the inside of the central wall 34 of the cover 3. Now, the item 4 can be put into the casing in a following workstation 79. If wished, a printing can be put on the item 4 in a following workstation 80 and the casing can now be closed in an accordingly executed workstation 81. The casing can now be transported to a packaging station 82.

Said work stations 70 to 82 can be worked out in such a way, that all working operations can be executed automatically by the corresponding worked out arrangements. In the depicted example, the first three stations 70 to 72 are placed along a straight line. Beginning with the fourth workstation 73, the remaining workstations are placed along a circle. It should be understood without all, that the sequence and the place of the individual workstations can also be chosen differently from the described manner.

At the embodiments of the casing according to FIG. 12 to 15, the base 5 is attached to the upper- or inside of the bottom 2. The base 5 has a main body 6. This main body 6 is made out in the depicted case of one single piece of material. This piece of material can be thin-walled. For forming the base main body 6 a plastic can be used, which can be processed and shaped. Advantageously, said plastic can be so, that it can be shaped by the use of heat or that it can be injected or casted into a form. Such a base main body 6 can be glued or welded on the upper side of the bottom 2.

The base main body 6 has a base plate 10, which can bear the item 4. In the area of the margines of this base-plate 10, side walls 11, 12, 13 and 14 of the base main body 6 of the base-plate 10 hang down. The outline of the depicted base 5 is oblong, so that it has two longer walls 11 and 13 and two shorter walls or cross-walls 12 and 14. The longitudinal walls 11 and 13 of the base 5 are longer than the diameter of the disk shaped item 4. But they are shorter than the longitudinal sides or edges 21 and 23 of the bottom 2 of the base part 1, which extend in the same direction.

A stand 27 of 28 (FIG. 14 and 15) is attached to those edges of the cross-walls 12 and 14 of the base, which lie appart from the base plate 10. The respective stand 27 or 28 has the form of a material strip, which is in one piece with the assigned partition 12 or 14 and which stands under a right angle to the assigned partition 12 or 14. The stands 27 and 28 are directed towards the interior of the base 5, i.e. towards each other. The lower or the outer side of the stands 27 and 28 rests on the upper side of the bottom 2, where they can be fastened in the manner described in the foregoing.

The length of the shorter walls or cross-walls 12 and 14 of the base 5 is smaller than the diameter of the item 4 having the circular contour, so that two opposite marginal portions 141 or 142 of the item 4 resting on the base 5 projects from the base 5 and stands freely for grasping the item 4. Since the length of edges 22 and 24 of the bottom 2, which extend parallel to the cross-walls 12 and 14 of the base of 5, is larger than the length of the cross-walls 12 and 14, the bottom 2 has the sections 8 and 9 as already mentioned. These margin sections 8 and 9 of the bottom 2 are placed below the base 5 and they extend horizontally away from the opposite longitudinal walls 11 and 13 of the base 5. Such bottom sections 8 and 9 protect the border sections 141 and 142 of the disk-like article 4 against damaging, whereby said sections 141 and 142 project laterally from the opposite sides of the base 5.

The lower edge 35 of the longitudinal walls 11 and 13 lies in a distance from the bottom 2 of the casing and it is placed above the stands 27 and 28. Between the lower edge 35 of the respective longitudinal wall 11 or 13 and the upper side of the bottom 2 there is a gap on both the sides of the base 5. A specification (not shown) relating the item 4, having preferably the form of a booklet, can be brought through said gaps into the base 5. Said item and said booklet can then be transported together in the casing. In order to prevent that the insert or/and the specification slip out from the base 5, the base 5 is provided with a press tongue 60.

Said press tongue 60 is carried out as a U-shaped cut from the material of the receiving plate 20 and this material part 60 is bent out downwardly from the plane of the receiving plate 20, i.e. towards the stands 27 and 28 of the base 5. Laterlly, said material part 60 is defined by practically straight running legs 61 and 62 of the U-form. The free end of said material part 60 is defined by a connecting section 63, which connects together those ends of the U-legs 61 and 62, which lie away from the receiving plate 20 . This connecting section 63 can be arched. The press tongue 60 is connected to the receiving plate by means of a transition section 64. This transition section 64 is placed at the ends of the U-legs 61 and 62 which face the receiving plate 20. That one end portion of the press tongue 60 is bent upwardly, which compress the connecting section 63, so that the insert can even then reach the place underneath the press tongue if it is inserted into the base 5 in a direction, which is contrary to the direction of the press tongue 60.

In the middle area of the upper side of the receiving plate 20, a flat projection 170 is carried out, which can have a circular peripheral line. In the central area of this projection 170, a pin 171 is foreseen, which can go through a central opening in the item 4 and which centers the item 4 of the base 5 in such a way, that the edge portion of the item 4 doesn't touch the stops 25 and 26 of the base 5, when the casing is closed. The underside of that one part of the material of the item 4, which surrounds the opening in the item 4, lies on the flat projection 170. This provides an advantage, that the remaining material sections of the item 4 are in a distance from the surface of the receiving section 20 and that they cannot consequently touch the receiving section 20.

Figure 13:
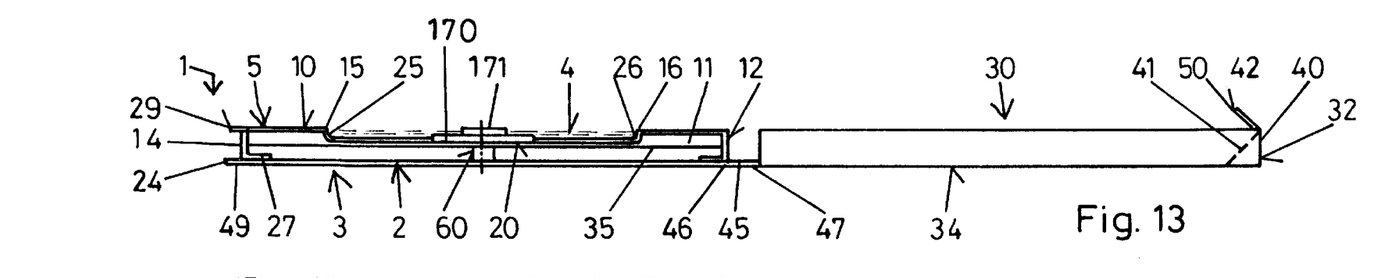
Figure 14:
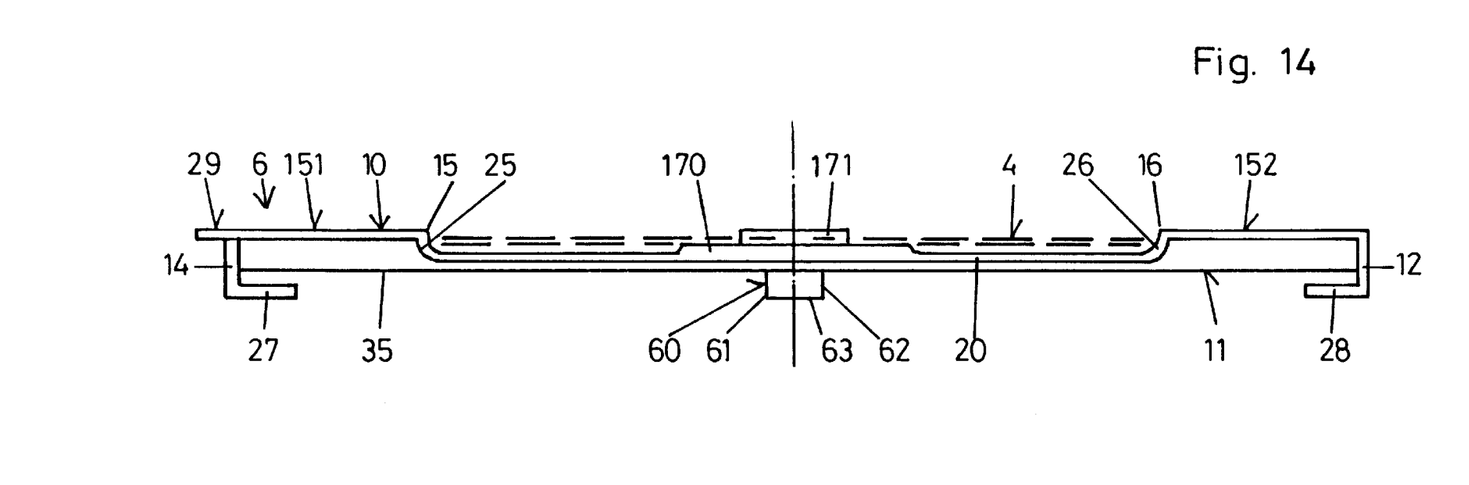
Figure 15:
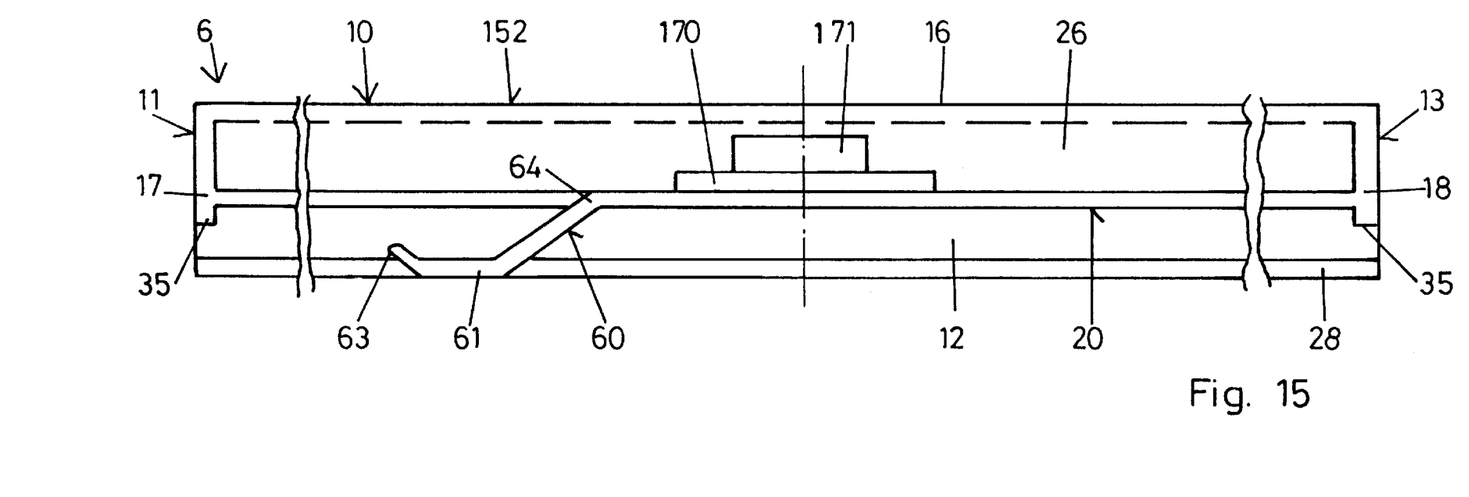

The material strip 45 is connected only to the base plate 3 of the base part 1, in fact over the bending line 46. Consequently the material strip 45 lies practically in the same plane as the base plate 3, if the casing is in the opened condition (FIG. 13). The cover 30 swings with respect to the base part 1 at both the bending lines 46 and 47, when the casing is being opened or closed.

Figure 16:
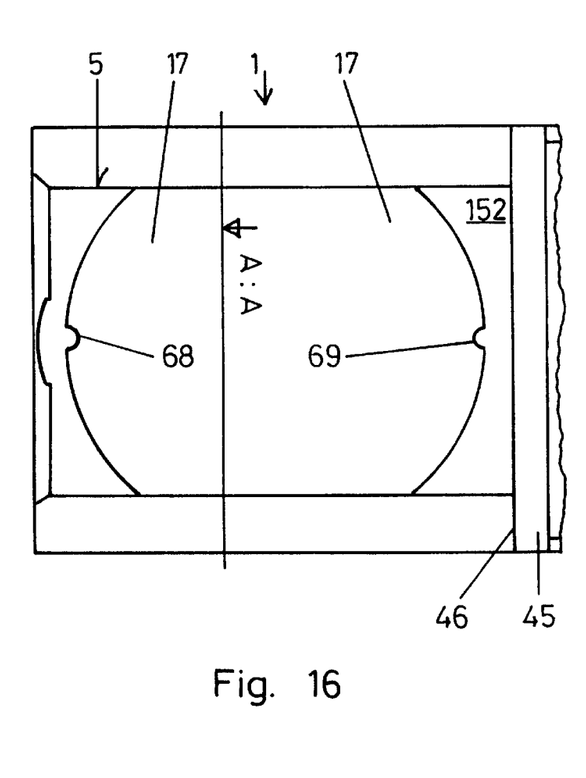

FIG. 16 shows a modification of the blank according to FIG. 8. At two places lying opposite each other, in fact approximately in the middle of the length of the respective arched cut 17, a bulge 68 and 69 is carried out in this cut 17. The respective bulge 68 or 69 defines a stop. After the blank has been shaped to the casing and if the item 4 is in this casing, then the stops 68 and 69 are placed over the edge part of the item 4. They prevent that the item 4 slips out from the lower part 1, after the casing has been opened.

What is claimed is:

1. A casing for a compact disk (4), comprising:
   a cover (30), and
   a housing (1) adapted to receive and hold the disk;
   the cover (30) and housing being made from a fiber material;
   the housing having a base (2) and a stand (5) engaged on a top surface of the base (2);
   a width of the base (2) being at least as large as a diameter of the disk (4) and a width of the stand (5) being smaller than the diameter of disk (4);
   the stand having a support surface (20) for the disk (4) spaced above and parallel to the base (2) and stops (25, 26) adapted to engage a circumference of the disk (4) when resting on the support surface (20);
   hinge means (45, 46 , 47) engaging the base (2) to the cover (30), the cover (30) having a top wall (34), a front end wall (32) and two side walls (31, 33) engaged perpendicular to the top wall (34);
   a tongue (50) projecting from a free end of the front end wall (32) towards an interior of the cover (30);
   a catch (29) projecting from the stand (5) to a front edge of the base (2);
   wherein when the casing is closed the tongue (50) engages the catch (29).

2. Casing as defined in claim 1, wherein longitudinal side walls (11, 13) of the stand (5) are longer than the diameter of the disk (4), and are shorter than longitudinal edges (21, 23) of the base (2).

3. Casing as defined in claim 1, wherein the catch (29) projects parallel to base (2).

4. Casing according to claim 3, wherein a width of the tongue (50), is longer than a width of catch (29).

5. Casing according to claim 3, wherein the catch (29) is arranged at a middle of a front wall of the stand (5) and the tongue (50) is arranged at a middle of the front end wall of the cover (30).

6. Casing according to claim 3, wherein a free edge (51) of the tongue (50) has a middle arched section (53) and two rectilinear sections (54, 55), a first end of rectilinear section (54, 55) respectively engaging ends of the curved section (53) and a second end of the rectilinear sections (54, 55) engaging a free edge (42) of the cover (30).

7. Casing according to claim 3, wherein a front edge (52) of the catch (29) is convex, and a radius thereof is the same as a radius of the arched section of the tongue (50).

8. Casing as defined in claim 3, wherein a margin (49) of base (2) projects out from base (2) and the catch (29) is situated above said margin (49) and a width of the catch (29) is smaller than a width of the margin (49).

9. Casing as defined in claim 2, wherein an outer contour of the cover (30) lies over and within an outer contour of the base (2) when the casing is closed.

10. Casing according to claim 1, wherein the hinge means comprises a material strip (45), which is situated between the base (2) and the top wall (34), a first longitudinal edge of the strip (45) being connected to the base (2), and a second longitudinal edge of the material strip (45) being connected to the cover (30), a width of said material strip (45) corresponding to a height of the stand (5).

11. Casing according to claim 10 wherein said hinge means has bending lines (46, 47) each of the bending lines extending parallel to a longitudinal edge of the material strip.

12. Casing according to claim 11, wherein the material strip (45) is connected over a first bending line (46) to a lower part (1) of the casing so that the hinge means (45) is freely swingable on the base (2).

13. Casing as defined in claim 1, a contour of the support surface (20) includes two arcs of a circle.

14. Casing as defined in claim 1, the contour of the support surface having two arched edges (17, 18), which are situated apart from each other and extend between longitudinal side walls (11, 13) of the stand (5), the contour also having two straight running edges (27, 28), connecting ends of the two arched edges (17, 18).

15. Casing as defined in claim 1, wherein a distance between the stops (25, 26) is equal to a length of a chord of the disk (4) lying over edges (27, 28) of the support surface.

16. Casing as defined in claim 3, wherein an insert (7) lies in a cavity (6) in the stand (5), the thickness of said insert (7) corresponding to a height of the cavity (6) and the insert (7) being made of a cellular board.

17. Casing according to claim 1, wherein a cavity is provided between the support surface (20) and the base (2) for a booklet.

18. Casing according to claim 1, wherein the stand (5) has legs (27, 28) and is provided with a press tongue (60), the press tongue (60) being formed as cut from the support surface (20), the press tongue being bent out downwardly from a plane of the support surface (20) towards the legs (27, 28) on the stand (5).

19. Casing according to claim 1, a flat projection (170) is placed in a middle area of support surface (20) which has a circular peripheral contour and a pin (171) is arranged in central area of said projection (170), which can go through a central opening in the disk (4) and center the disk.

* * * * *